United States Patent
Zhang et al.

(10) Patent No.: US 9,955,446 B2
(45) Date of Patent: *Apr. 24, 2018

(54) FREQUENCY OFFSET COMPENSATION FOR WIFI RANGING

(71) Applicant: MARVELL WORLD TRADE LTD., St. Michael (BB)

(72) Inventors: Hongyuan Zhang, Fremont, CA (US); Mao Yu, San Jose, CA (US); Su Khiong Yong, Santa Clara, CA (US); Sudhir Srinivasa, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 49 days.

This patent is subject to a terminal disclaimer.

(21) Appl. No.: 14/987,264

(22) Filed: Jan. 4, 2016

(65) Prior Publication Data

US 2016/0119889 A1 Apr. 28, 2016

Related U.S. Application Data

(63) Continuation of application No. 14/170,027, filed on Jan. 31, 2014, now Pat. No. 9,232,493.

(Continued)

(51) Int. Cl.
*H04W 56/00* (2009.01)
*H04W 64/00* (2009.01)
(Continued)

(52) U.S. Cl.
CPC .......... *H04W 56/004* (2013.01); *G01S 5/06* (2013.01); *G01S 11/02* (2013.01); *G01S 13/767* (2013.01);
(Continued)

(58) Field of Classification Search
None
See application file for complete search history.

(56) References Cited

U.S. PATENT DOCUMENTS 5,491,728 A * 2/1996 Verhille ............... H04L 49/30
370/394
7,248,590 B1 * 7/2007 Liu ..................... H04L 29/06027
370/395.64

(Continued)

FOREIGN PATENT DOCUMENTS

WO WO-2009/059229 5/2009

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., (Mar. 29, 2012).

(Continued)

*Primary Examiner* — Chi H Pham
*Assistant Examiner* — Shick Hom

(57) ABSTRACT

Methods, systems, and apparatus are disclosed for determining accurate ranging measurements between communication devices. Various embodiments are described for recording timestamps associated with when transmissions are sent and received between the communication devices. The communication devices are configured to determine a difference in their clock frequencies and to communicate this difference with one another. Furthermore, each of the communication devices is configured to compensate for these differences before or after the timestamps are exchanged and to send a compensation indicator of whether the compensation has been performed. If the compensation has not been per- (Continued)

formed, either of the communication devices can compensate for the clock frequency differences after receiving the timestamps based on the compensation indicator. By using compensated clock frequencies based on a single clock reference, highly accurate ranging measurements are obtained using round trip propagation time calculations.

24 Claims, 6 Drawing Sheets

Related U.S. Application Data

(60) Provisional application No. 61/862,650, filed on Aug. 6, 2013, provisional application No. 61/759,230, filed on Jan. 31, 2013.

(51) Int. Cl.
 G01S 11/02 (2010.01)
 G01S 13/76 (2006.01)
 G01S 5/06 (2006.01)

(52) U.S. Cl.
 CPC ....... *H04W 56/002* (2013.01); *H04W 64/003* (2013.01)

(56) References Cited

U.S. PATENT DOCUMENTS

| | | |
|---|---|---|
| 7,302,225 B2 | 11/2007 | Younis |
| 7,742,390 B2 | 6/2010 | Mujtaba |
| 8,023,976 B2 | 9/2011 | Shao et al. |
| 8,270,909 B2 | 9/2012 | Zhang et al. |
| 8,289,869 B2 | 10/2012 | Sawai |
| 8,332,732 B2 | 12/2012 | Lakkis |
| 8,619,907 B2 | 12/2013 | Mujtaba et al. |
| 8,699,406 B1 | 4/2014 | Charles et al. |
| 9,232,493 B2 * | 1/2016 | Zhang ..................... G01S 11/02 |
| 2002/0009974 A1 | 1/2002 | Kuwahara et al. |
| 2005/0026563 A1 | 2/2005 | Leeper et al. |
| 2006/0234724 A1 | 10/2006 | Syrjarinne et al. |
| 2009/0196163 A1 | 8/2009 | Du |
| 2010/0309834 A1 | 12/2010 | Fischer et al. |
| 2011/0002219 A1 | 1/2011 | Kim et al. |
| 2012/0039196 A1 | 2/2012 | Zhang |
| 2013/0183906 A1 | 7/2013 | Tavildar et al. |

OTHER PUBLICATIONS

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11v™ /D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 802.11 Wireless Network Management The Institute of Electrical and Electronics Engineers, Inc., (Aug. 2010).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jan. 2012.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jun. 2012.

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Oct. 2012.

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jan. 2013.

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jul. 2013.

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std P802.11ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," The Institute of Electrical and Electronics Engineers, Inc., Sep. 2011.

IEEE Std 802.11ad™ /D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band The Institute of Electrical and Electronics Engineers, Inc., (Jul. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11ah™ /D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz

(56) References Cited

OTHER PUBLICATIONS

License Exempt Operation," The Institute of Electrical and Electronics Engineers, Inc., pp. 1-394 (Oct. 2013).
International Search Report and Written Opinion for International Application No. PCT/US2014/014179, dated May 9, 2014.
International Preliminary Report on Patentability in International Application No. PCT/US2014/014179, dated Aug. 13, 2015 (8 pages).
Aldana et al., IEEE P802.11—Wireless LANs, "CIDs 46,47,48 Regarding Fine Timing Measurement," The Institute of Electrical and Electronics Engineers, Inc., doc.: IEEE 802.11 11-12-1249-04-000m (Jan. 2013).
Ansari et al., "Unified MIMO Pre-Coding Based on Givens Rotation," The Institute of Electrical and Electronics Engineers, doc. No. IEEE C802.16e-04/516r2, pp. 1-13, Jan. 11, 2005.
Bajko, "LB150 Timing Measurement Comment Resolutions Normative Text", The Institute of Electrical and Electronics Engineers, doc. No. IEEE 802.11-09/0806r0 (Jul. 2009).
Harada, "Project: IEEE P802.15 Working Group for Wireless Personal Area Network (WPANs)," IEEE 802.15/07/0693-003c (May 2007).
Love et al., "An Overview of Limited Feedback in Wireless Communication Systems," IEEE J. on Selected Areas in Communications, vo. 26, No. 8, Oct. 2008.
Perahia et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.
Stacey et al., "IEEE P802.11, Wireless LANs, Proposed TGac Draft Amendment," Institute of Electrical and Electronics Engineers, doc. No. IEEE 802.11-10/1361r3 (Jan. 2011).
Stacey et al., "Specification Framework for TGac," document No. IEEE 802.11-09/0992r20, Institute for Electrical and Electronics Engineers, pp. 1-49, Jan. 18, 2011.
Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).
"Wi-Fi Peer-to-Peer (P2P) Technical Specification, Version 1.00", Wi-Fi Alliance, pp. 1-135, Dec. 1, 2009.
Notice of Reasons for Rejection in Japanese Patent Application No. 2015-556173, dated Jan. 29, 2018, with English translation (5 pages).

\* cited by examiner

FREQUENCY OFFSET COMPENSATION FOR WIFI RANGING

CROSS REFERENCES TO RELATED APPLICATIONS AND INCORPORATION BY REFERENCE

This application is a continuation of U.S. application Ser. No. 14/170,027, now U.S. Pat. No. 9,232,493, entitled "Frequency Offset Compensation for WiFi Ranging," filed on Jan. 31, 2014, which claims the benefit of U.S. Provisional Application No. 61/759,230, entitled "Frequency Offset Compensation for Wi-Fi Ranging," filed on Jan. 31, 2013, and U.S. Provisional Application No. 61/862,650, entitled "PPM Issue for FTM," filed on Aug. 6, 2013. The disclosures of all applications referenced above are hereby incorporated herein by reference in their entireties.

FIELD OF THE DISCLOSURE

The present disclosure relates generally to wireless communication networks and, more particularly, to methods and systems for measuring transmission times between wireless communication devices.

BACKGROUND

Using location information amongst wireless communication networks such as wireless wide area networks (WWAN), wireless local area networks (WLAN), cellular networks, and wireless personal area networks (WPAN) has become increasingly common. Moreover, obtaining measurements of distance between communication devices within a wireless network is advantageous, since it provides insight regarding wireless ranging. Such measurements are often performed by calculating propagation time using time-stamped time of arrival (ToA) and time of departure (ToD) information exchanged between two or more communication devices.

SUMMARY OF THE DISCLOSURE

Methods, systems, and apparatus are disclosed for determining accurate ranging measurements between communication devices. By using compensated clock frequencies based on a single communication device clock reference, differences between clock frequencies that are implemented at each communication device can be eliminated. As a result, highly accurate propagation times can be determined for signal propagations between communication devices, and therefore highly accurate ranging measurements can likewise be obtained using round trip propagation time calculations.

In an embodiment, a method for clock compensation between i) a first communication device utilizing a first clock having a first clock frequency, and ii) a second communication device utilizing a second clock having a second clock frequency includes determining, at the first communication device, a first timestamp corresponding to when a first transmission is transmitted by the second communication device and determining, at the first communication device, a second timestamp corresponding to when a second transmission is received at the second communication device. The method further includes determining, at the first communication device, whether a compensation indicator has been received from the second communication device, and compensating, at the first communication device, for a difference between the first clock frequency and the second clock frequency to provide a compensated first timestamp and a compensated second timestamp when it is determined that the compensation indicator has not been received from the second communication device. Further in accordance with such an embodiment, the presence of the compensation indicator indicates that the first timestamp and second timestamps are received in terms of the first clock frequency and do not need to be compensated.

In another embodiment, a method for clock compensation between i) a first communication device utilizing a first clock having a first clock frequency, and ii) a second communication device utilizing a second clock having a second clock frequency includes determining, at the first communication device, a first timestamp corresponding to when a first transmission is transmitted by the first communication device and determining, at the first communication device, a second timestamp corresponding to when a second transmission is received at the first communication device. The method further includes compensating, at the first communication device, for a difference between the first clock frequency and the second clock frequency to provide a compensated first timestamp and a compensated second timestamp, sending, from the first communication device, the compensated first timestamp and the compensated second timestamp to the second communication device, and sending, from the first communication device, a compensation indicator to the second communication device. Further in accordance with such an embodiment, the compensation indicator indicates that the second communication device does not need to compensate for the difference between the first clock frequency and the second clock frequency with respect to the compensated first timestamp and the compensated second timestamp.

In yet another embodiment, a first communication device is configured to utilize a first clock having a first clock frequency and includes a network interface configured to determine a first timestamp corresponding to when a first transmission is transmitted by a second communication device that utilizes a second clock having a second clock frequency, and to determine a second timestamp corresponding to when a second transmission is received at the second communication device. The first communication device further includes a clock calculation and compensation unit configured to determine whether a compensation indicator was received from the second communication device, and to compensate for differences between the first clock frequency and the second clock frequency to provide a compensated first timestamp and a compensated second timestamp when the compensation indicator is not received from the second communication device. Further in accordance with such an embodiment, the presence of the compensation indicator indicates that the first timestamp and the second timestamp are received in terms of the first clock frequency and do not need to be compensated.

In a further embodiment, a first communication device is configured to utilize a first clock having a first clock frequency and includes a network interface configured to determine a first timestamp corresponding to when a first transmission is transmitted by the first communication device, and to determine a second timestamp corresponding to when a second transmission is received at the first communication device. Furthermore, the second transmission is transmitted by a second communication device that is configured to utilize a second clock having a second clock frequency. The first communication device further includes a clock calculation and compensation unit configured to compensate for differences between the first clock frequency and the second clock frequency to provide a compensated first timestamp and a compensated second timestamp. Further in accordance with such an embodiment, the network interface is also configured to cause the first communication device to send the compensated first timestamp and the compensated second timestamp and a compensation indicator to the second communication device, the compensation indicator indicates that the compensated first timestamp and the compensated second timestamp do not need to be compensated by the second communication device.

DETAILED DESCRIPTION

Embodiments of methods and apparatus for measuring propagation time for transmissions between communication devices are disclosed herein. In some embodiments, propagation time is measured using time stamps, such as time of time of departure and a time of arrival. In some scenarios, propagation times may be on the order of nanoseconds, and thus obtaining accurate measurements using timestamps requires accurate timestamp measurements, at least in some embodiments. However, differences between clock frequencies (such as due to frequency drift) used by each communication device when generating timestamps introduce inaccuracies in timestamp measurements, at least in some scenarios. Thus, in various embodiments disclosed herein, techniques that account for differences between clocks of different communication devices are utilized to mitigate inaccuracies in timestamp measurements.

Figure 1:
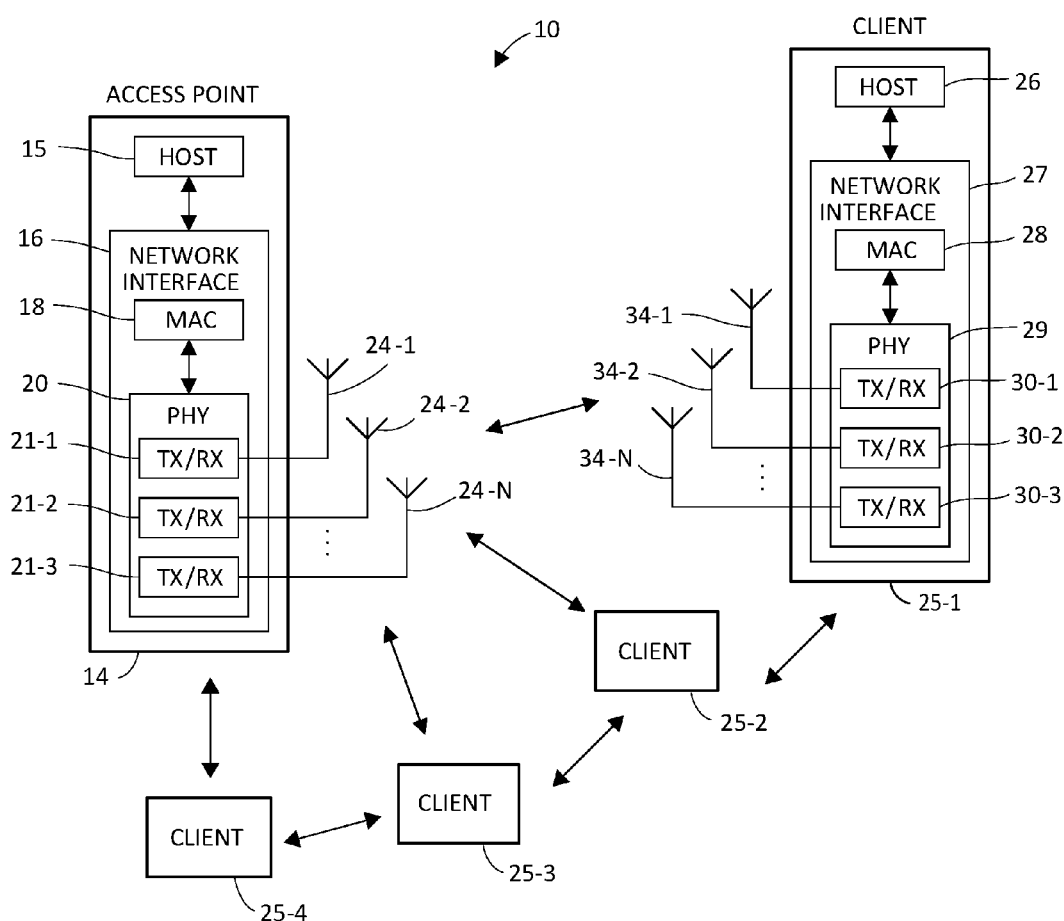
FIG. 1 is a block diagram of an example network 10 in which one or more communication devices utilize propagation time measurement techniques in accordance with an embodiment of the present disclosure.

FIG. 1 is a block diagram of an example network 10 in which one or more communication devices utilize propagation time measurement techniques in accordance with an embodiment of the present disclosure. An access point (AP) 14 includes a host processor 15 coupled to a network interface 16. Network interface 16 includes a medium access control (MAC) processing unit 18 and a physical layer (PHY) processing unit 20. PHY processing unit 20 includes one or more transceivers 21, which are coupled to one or more antennas 24. As will be appreciated by those of skill in the art, although three transceivers 21 and three antennas 24 are illustrated in FIG. 1, various embodiments of AP 14 include any suitable number (e.g., 1, 2, 4, 5, etc.) of transceivers 21 and antennas 24. Further in accordance with various embodiments, any suitable number of transceivers 21 are coupled to any suitable number of antennas 24, such that one or more antennas are shared between transceivers and/or vice versa.

Network 10 includes a plurality of client stations 25. Although four client stations 25 are illustrated in FIG. 1, various embodiments of network 10 include any number (e.g., 1, 2, 3, 5, 6, etc.) of client stations 25. A client station 25-1 includes a host processor 26 coupled to a network interface 27. Network interface 27 includes a MAC processing unit 28 and a PHY processing unit 29. PHY processing unit 29 includes one or more transceivers 30, which are coupled to one or more antennas 34. Although three transceivers 30 and three antennas 34 are illustrated in FIG. 1, various embodiments of client station 25-1 include any suitable number (e.g., 1, 2, 4, 5, etc.) of transceivers 30 and antennas 34. Further in accordance with various embodiments, any suitable number of transceivers 30 are coupled to any suitable number of antennas 34, such that one or more antennas are shared between transceivers and/or vice versa.

In accordance with various embodiments of the present disclosure, any suitable number of client stations 25-2, 25-3, and 25-4 has a structure the same as or substantially similar to client station 25-1. In accordance with such embodiments, client stations 25 structured the same as or substantially similar to client station 25-1 include any suitable number of transceivers and antennas. For example, although client station 25-1 is illustrated as having three transceivers 34 and antennas 30, various embodiments of client station 25-2 have a suitable number of transceivers different than three, and a suitable number of antennas different than three. The numbers of antennas and transceivers associated with clients 25-2, 25-3, and 25-4 is not shown in FIG. 1 for purposes of brevity.

Network 10 supports communications in accordance with any number of suitable communication protocols, such as mobile telephony protocols, wireless local area network (WLAN) communication protocols specified by one or more IEEE standards, wireless personal area communication network protocols (e.g., the BLUETOOTH® protocol), WiMAX, etc. Examples of suitable IEEE standards include 802.11a, 802.11, g, 802.11n, 802.11ac, 802.11ad, 802.11af, 802.11v, and/or 802.11ah standards. Although AP 14 is labeled as an access point, various embodiments of AP 14 are configured to support any suitable type of wireless communications and are not limited to supporting only WLAN technologies. For example, various embodiments of AP 14 are configured to support WLAN and/or mobile telephony protocols such as 3rd Generation Partnership Project (3GPP) technologies including Long Term Evolution (LTE) protocols. Although FIG. 1 illustrates only a single AP 14, various embodiments of client devices 25 are configured to communicate with more than a single AP at any time, including simultaneous communications with separate APs using communication protocols that may be the same or different from one another. In accordance with an embodiment of the present disclosure, AP 14 and client stations 25 are configured to transmit and receive data conforming to one or more communication protocols such as protocols conforming to one or more IEEE 802.11 standards or other suitable communication protocols. In accordance with another embodiment of the present disclosure, client stations 25 are configured, additionally or alternatively, to transmit and receive data with one another conforming to one or more communication protocols such as protocols conforming to one or more IEEE 802.11 standards, or other suitable communication protocols, to support ad-hoc networking.

In various embodiments, AP 14 and/or clients 25 determine timestamps associated with when communications are sent (Time-of Departure (ToD) timestamps) from AP 14 and/or a client 25 and received (Time-of-Arrival (ToA) timestamps) at another AP 14 and/or client 25. These timestamps are generated using any suitable number of oscillators and/or clocks that are implemented within AP 14 and/or clients 25. AP 14 and/or clients 25 are configured to determine when their own communications are sent (ToD) to another AP 14 and/or clients 25 and to generate ToD time stamps that indicate when the communications were sent. Similarly, AP 14 and/or clients 25 are configured to determine when communications are received (ToA) and to generate ToA time stamps that indicate when the communications were received. The network interfaces 16, 27 are configured to add ToD time stamps to communication units as, or shortly before, the communication units are transmitted, in some embodiments. Similarly, network interfaces 16, 27 are configured to add ToA time stamps to communication units as, or shortly after, the communication units are received, in some embodiments. As will be described in more detail below, network interfaces 16, 27 are configured to optionally transmit or feedback ToA time stamps and ToD timestamps to one or more other communication devices (e.g., the AP 14 and/or one or more clients 25) for facilitate the one or more other communication device calculating a propagation time and/or round trip time corresponding to communications between communication devices in the network 10.

Although an oscillator and/or clock included in and/or used by the network interfaces 16, 27 may be manufactured and/or designed to operate at the same nominal frequency, manufacturing variances and/or frequency drift may result in the oscillators and/or clocks in and/or used by the network interfaces 16, 27 to differ in frequency from one another. Such frequency differences may be the result of various factors such as differences in temperature, manufacturing variances, crystal imperfections, etc. In various embodiments, network interfaces 16, 27 are configured to determine a difference between clock frequencies of two or more communication devices within network 10 that are in communication with one another.

The network interfaces 16, 27 are further configured to compensate for such clock frequency differences to provide a more accurate propagation time measurement from the perspective of a single communication device. In accordance with various embodiments, one or more of the network interfaces 16, 27 are configured to communicate an indicator, notification, and/or flag to another AP 14 and/or client 25 that indicates the timestamp fed back to another AP 14 and/or client 25 has already been compensated by the network interface 16, 27. One or more of the network interfaces 16, 27 are configured to (i) compensate for differences in clock frequencies between two or more communication devices if a compensation indication, such as described above, is not received, and (ii) not to compensate for differences in clock frequencies between two or more devices if a compensation indication, such as described above, is received.

Using the ToA and ToD timestamps, one or more of the network interfaces 16, 27 are configured to calculate a propagation time corresponding to transmission of signals between two or more devices in communication with one another. After the frequency compensation, this propagation time is essentially based on a single device clock reference, and therefore is a more accurate measurement of the propagation time as compared to calculating propagation time using uncompensated time stamps determined by different communication devices. Since propagation time of signal transmissions occur at a known or assumed constant value (i.e., the speed of light in a particular propagation medium such as air) the distance between devices can be readily estimated from the propagation time. In this way, various embodiments of the present disclosure provide for the calculation of accurate distance information between AP 14 and/or clients 25 in communication with one another.

In accordance with various embodiments, AP 14 and/or client stations 25 (e.g. one or more of the network interfaces 16, 27) are configured to share the distance information with other communication devices within network 10, such as other clients 25 and/or the AP 14. In this way, the AP 14 and/or clients 25 obtain accurate distance information regarding other communication devices, allowing for more accurate wireless ranging assessments.

Figure 2:
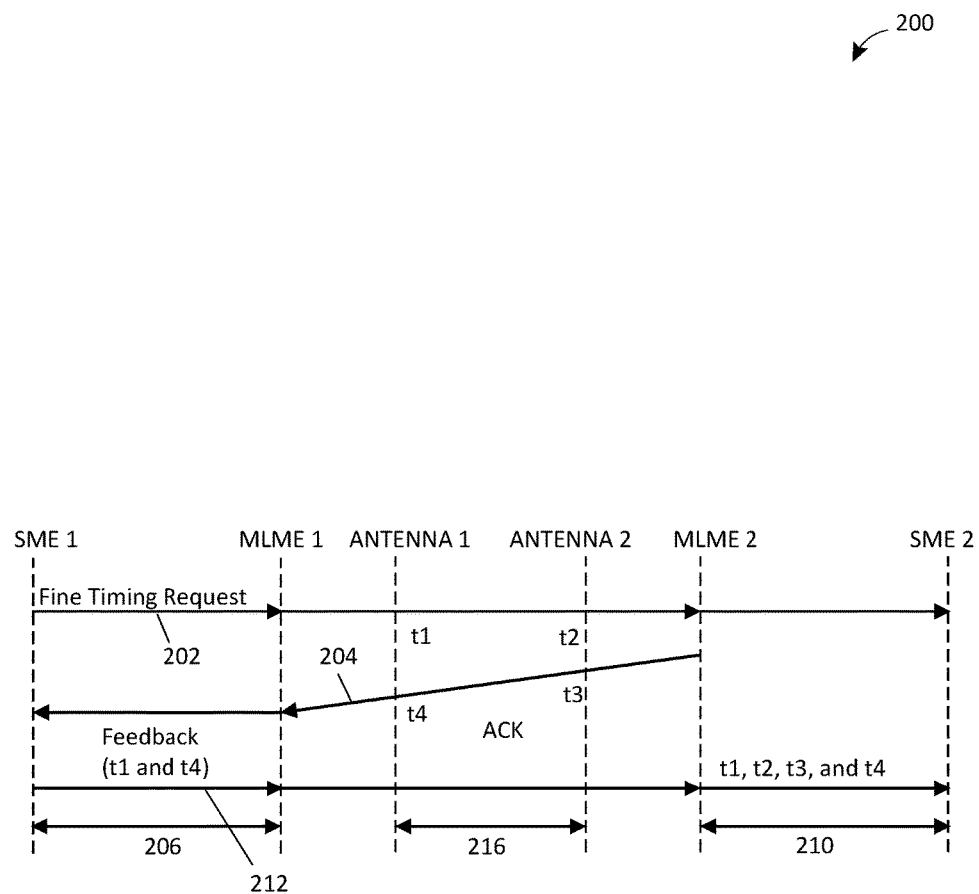
FIG. 2 is a timing diagram in accordance with an embodiment of the present disclosure.

FIG. 2 is a timing diagram 200 in accordance with an embodiment of the present disclosure. Timing diagram 200 illustrates a single frame exchange between two communication devices (e.g., between AP 14 and one of the clients 25 or between two of the clients 25 of FIG. 1). In accordance with an embodiment of the present disclosure, station management entity (SME) 1, medium access control (MAC) sub layer management entity (MLME) 1, and antenna 1 are implemented within a first communication device that is a part of network 10, such as AP 14 for example. For example, in an embodiment, SME 1 is implemented in the host processor 15, MLME 1 is implemented in the MAC processor 18, and antenna 1 corresponds to one or more of the antennas 24, in an embodiment. Further in accordance with such an embodiment, SME 2, MLME 2, and antenna 2 are implemented within a second communication device that is a part of network 10, such as client 25, for example. For example, in an embodiment, SME 2 is implemented in the host processor 26, MLME 2 is implemented in the MAC processor 28, and antenna 2 corresponds to one or more of the antennas 34, in an embodiment. In other embodiments, timing diagram 200 is applicable to any suitable communication devices implementing various embodiments of the present disclosure and is not limited to only the particular devices described above, or even to device that are a part of network 10. For example, in an embodiment, SME 1 is implemented in the host processor 26 of station 25-1, MLME 1 is implemented in the MAC processor 28 of station 25-1, and antenna 1 corresponds to one or more of the antennas 34 of station 25-1, and SME 2 is implemented in a host processor of station 25-2, MLME 2 is implemented in a MAC processor of station 25-2, and antenna 2 corresponds to one or more of antennas of station 25-2, in an embodiment.

In accordance with an embodiment of the present disclosure, a station management entity (SME) of a first communication device (SME 1) processes and sends a fine timing measurement request frame 202 via a MAC layer management entity (MLME) of the first communication device (MLME 1) to a second communication device. For example, the fine timing measurement request frame 202 is transmitted via a corresponding antenna of, or coupled to, the first communication device (ANTENNA 1). Fine timing measurement request frame 202 is received via an antenna of, or coupled to, the second communication device (ANTENNA 2), and is processed by an MLME of the second communication device (MLME 2) and/or an SME of the second communication device (SME 2). Upon receiving the fine timing measurement request frame 202, the second communication device responds by generating an acknowledgement frame (ACK 204) (e.g., using the MLME 2), and transmitting ACK frame 204 back to the first communication device via ANTENNA 2.

In accordance with various embodiments of the present disclosure, the first and second communication devices implement one or more communication protocols, such as a protocol governed by an IEEE 802.11 standard, for example, to exchange fine timing measurement request frame 202 and ACK frame 204. Often, such communication protocols generally define frame timing, processing timing, etc. In accordance with these embodiments, the first and second communication devices place timestamps corresponding to when fine timing measurement request frame 202 and ACK frame 204 are sent and received in accordance with a corresponding protocol.

For example, the first communication device sends fine timing measurement request frame 202 to the second communication device at time t1. Time t1 corresponds to a time when fine timing measurement request frame 202 is actually transmitted from ANTENNA 1. The first communication device is configured to take into account local processing delays that may be caused by processing and/or front end conversion between baseband, frame timing, etc. Processing delays may be represented by a processing time 206 associated with time needed to process fine timing measurement request frame 202 prior to the fine timing measurement request frame 202 being transmitted. Since fine timing measurement request frame 202 is a known and/or standardized length, these processing delays are generally predictable and repeatable. As a result, these processing delays may be taken into account such that timestamp t1 accurately reflects the actual time that fine timing measurement request frame 202 is transmitted via ANTENNA 1.

In accordance with various embodiments of the present disclosure, each of the first and second communication devices is configured to use a respective local oscillator and/or clock to generate the timestamp. Although any oscillator and/or clock may be used to track time and generate the corresponding timestamp t1, it is preferable to utilize a high accuracy clock to provide a more accurate timestamp. For example, IEEE 802.11 standards specify the frequency error of the reference clock as ±25 ppm maximum for the 2.4 GHz band. In accordance with an embodiment of the present disclosure, a Wi-Fi reference clock specified by IEEE 802.11 standards is used to track time and generate corresponding timestamps. Such a clock is also utilized in a communication device to generate a carrier signal, in some embodiments. Thus, differences between references clocks of a first communication device and a second communication device is reflected in an offset between i) a frequency of a first carrier signal generated by the first communication device and ii) a frequency of a second carrier signal generated by the second communication device, in some embodiments. Such offset between frequencies of carrier signals is often referred to as a carrier frequency offset (CFO). In some embodiments, a CFO is measured by a first communication device and is utilized to adjust a time stamp generated by the first communication device or to adjust a time stamp generated by the second communication device, as is described in more detail below.

In accordance with various embodiments of the present disclosure, the first and second communication devices implement more than one radio access technology (RAT), such as cellular and Wi-Fi, for example. In accordance with such embodiments, timestamps are generated using a cellular-based clock which tends to have higher accuracy requirements as compared to a clock corresponding to a Wi-Fi communication device. For example, the first and/or second communication device may be implemented as part of a user equipment (UE), such as a smartphone configured to operate according to the LTE protocol. Since the LTE air interface protocol requires a strict oscillator drift specification of only 50 parts-per-billion (ppb) for the air interface, such a clock reference would provide an accurate timestamp.

In accordance with an embodiment of the present disclosure, the first communication device is configured to determine timestamp t1 as a ToD of fine timing request 202, and the second communication is configured to determine timestamp t2, associated with receipt of the fine timing measurement request frame 202, as a ToA of fine timing request 202. The first and second communication devices are each configured to compensate for local processing delays to determine a precise ToD t1 and ToA t2 as discussed above. Further in accordance with such an embodiment, the second communication device generates a timestamp t3 associated with a time the ACK frame 204 is sent (e.g., ToD of ACK 204), and the first communication device determines a precise timestamp t4 associated with when the ACK frame 204 is received (e.g., ToA of ACK 204). Again, the first and second communication devices are each configured to compensate for processing delays to determine a precise ToD t3 and ToA t4 as discussed above. For example, processing delays at the second communication device may be represented by a processing time 210 associated with time needed to process fine timing measurement request frame 202 after the fine timing measurement request frame 202 has been received at ANTENNA 2. Processing delay 210 may be taken into account such that timestamp t2 accurately reflects the actual time that fine timing measurement request frame 202 is received at ANTENNA 2. Similarly, processing delays are taken into account when generating time stamp t3 and timestamp t4.

In accordance with an embodiment of the present disclosure, the first and second communication devices each stores its respective ToA and ToD timestamps. For example, the first communication device stores timestamps t1 and t4, and the second communication device stores timestamps t2 and t3. Further in accordance with such an embodiment, the first communication device is configured to send feedback 212, including timestamps t1 and t4, back to the second communication device. Although FIG. 2 illustrates timestamps t1 and t4 being sent to the second communication device, at least some embodiments additionally or alternatively include the second communication device sending timestamps t2 and t3 back to the first communication device as feedback (not shown in FIG. 2). In this way, the first and/or second communication device acquires all four timestamps t1, t2, t3, and t4 after a frame exchange and feedback transmission, according to various embodiments.

Once the first and/or second communication device acquires all four timestamps, a signal transmission propagation time 216 between the first and second communication device can be calculated. In accordance with an embodiment, the first and/or second communication device calculates propagation time 216 based on half the round trip time between the first and second communication devices. For example, a round trip time estimate is calculated based on uncompensated timestamps according to:

$$RTT_{EST} = (t_4 - t_1) + (t_2 - t_3).\qquad\text{Equ. 1:}$$

Determining the round trip time in this way eliminates clock inaccuracies between the first and second communication device outside the frame exchange time periods represented in FIG. 2, but not during the frame exchange time period. For some applications, the clock error (e.g., due to differences in frequencies between the clock of the first communication device and the clock of the second communication device) introduced during the frame exchange is acceptable. But since signal propagation time is on the order of nanoseconds, the clock error introduced during the frame exchange is not negligible, and does not provide an adequate measurement to accurately determine a distance between the first and second communication devices in some scenarios and/or embodiments.

Therefore, in various embodiments of the present disclosure, the first and/or second communication device is configured to compensate for differences in frequencies between the clock of the first communication device and the clock of the second communication device, and to calculate the round trip time based on time stamps compensated to account for the differences in clock frequencies. In this way, a more accurate round trip time is calculated that eliminates and/or reduces errors due to clock offset between the first and second communication devices.

Figure 3:
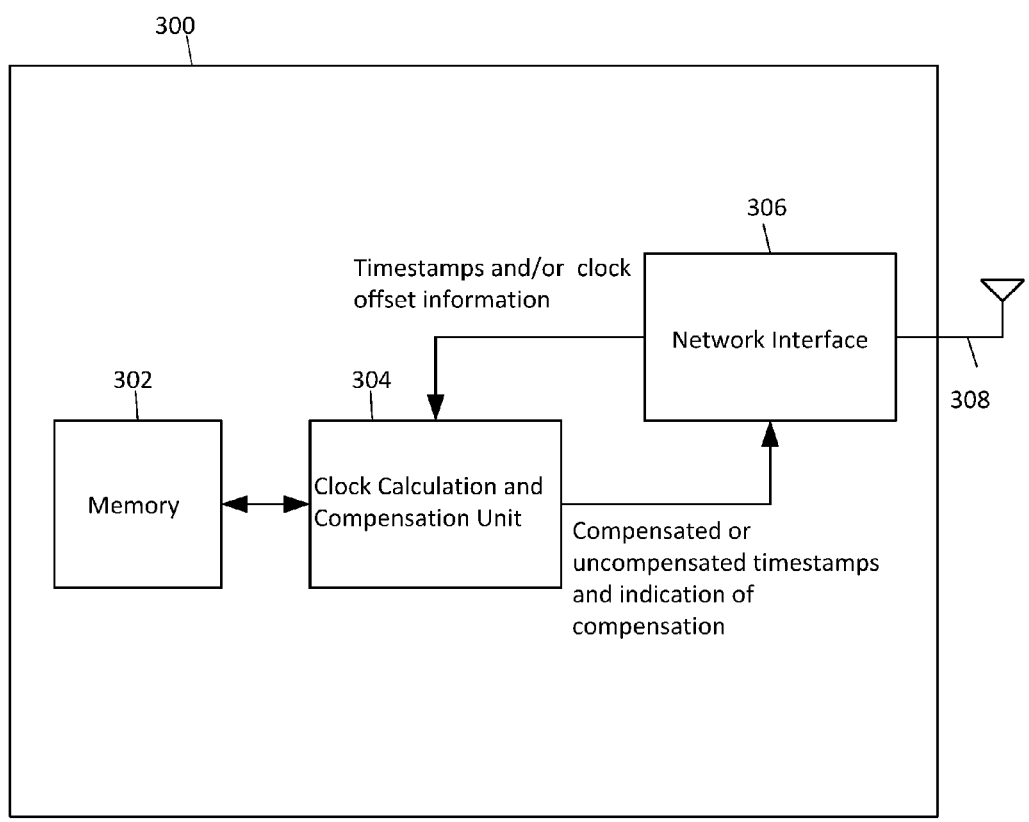
FIG. 3 is a block diagram of an example communication device in accordance with an embodiment of the present disclosure.

FIG. 3 is a block diagram of an example communication device 300 in accordance with an embodiment of the present disclosure. Communication device 300 includes memory 302, clock calculation and compensation unit 304, network interface 306, and antenna 308. In accordance with various embodiments of the present disclosure, communication device 300 is, or is implemented as part of, a communication device in network 10, such as client 25 in FIG. 1, the first communication device, and/or the second communication device described with reference to FIG. 2, for example. In accordance with further embodiments, communication device 300 is, or is implemented as part of, any suitable communication device and is not limited to only those devices that are a part of network 10 or those devices described with respect to FIG. 2.

Network interface 306 is coupled to clock calculation and compensation unit 304 and configured to communicate with clock calculation and compensation unit 304 and transmit to and receive wireless communications from other communication device via antenna 308. In accordance with various embodiments, network interface 306 is configured to communicate with one or more communication devices via one more suitable communication protocols. As will be appreciated by those of skill in the relevant art(s), network interface 306 may be implemented with any number of MAC interfaces, MLMEs, MAC sublayer management entities, PHY interfaces, PHY management entities, SMEs, transceivers, etc. In various embodiments, network interface 306 is an implementation of network interfaces 16 or 27 as shown in FIG. 1 and is configured to operate in accordance with a wireless networking protocol.

Network interface 306 is configured to send fine timing request frames to another communications device and to determine an appropriate time stamp associated with when the fine timing request is sent from antenna 308 (e.g., t1 ToD). Network interface 306 is configured to receive ACK frames from another communication device and to determine when the ACK frame is received at antenna 308 (e.g., t4 ToA). As previously discussed with reference to FIG. 2, network interface 306 is configured to compensate for processing delays of fine timing request frames and/or ACK frames to accurately determine corresponding ToA and ToD timestamps. Network interface 306 is configured to send the ToA and/or ToD timestamps to another communication device.

Additionally or alternatively, network interface 306 is configured to determine a clock frequency used by the communication device sending the ACK frame. This information may be obtained, for example, as part of a synchronization protocol and/or information that is transmitted from the communication device sending the ACK frame, or during an initial association period between the two communication devices. In embodiments in which a carrier frequency is used as a reference to generate the timestamps, and/or the carrier frequency is determined with a clock that is also used to generate the timestamps, network interface 306 is configured to determine a CFO between a carrier frequency used by the network interface 306 versus a carrier frequency used by another communication device. In accordance with further embodiments, the CFO is included in a receive vector as part of a communication protocol. For example, the network interface 306 is configured to determine the CFO and then transmit an indication of the determined CFO to the other communication device, in an embodiment. Similarly, as another example, if the other communication device determines the CFO, the network interface 306 is configured to receive an indication of the CFO from the other communication device, in an embodiment.

Network interface 306 is configured to determine a clock offset based on a determined difference between a i) local clock of, or used by, network interface 306 and ii) a clock frequency of a clock of, or used by, the other communication device, e.g., the communication sending the ACK frame to the communication device 300. Network interface 306 is configured to send the clock offset information and/or ToA/ToD timestamps to clock calculation and compensation unit 304.

In an embodiment, clock calculation and compensation unit 304 is configured to compensate ToA and/or ToD timestamps by converting the timestamps to the time rail of the communication device sending the ACK frame. In an embodiment, clock calculation and compensation unit 304 includes any number of processors and/or controllers configured to execute software or firmware instructions to accomplish such calculations and/or to enable communications with network interface 306. In an embodiment, clock calculation and compensation unit 304 is a host processor. In other embodiments, clock calculation and compensation unit 304 is implemented using hardware such as one or more integrated circuit devices, an application specific integrated circuit, a programmable logic device, etc. In some embodiments, clock calculation and compensation unit 304 is included in the network interface 306. Clock calculation and compensation unit 304 is configured to compensate for clock offsets with regard to the ToA and/or ToD timestamps, as discussed above, and to send the corrected timestamp information to network interface 306 for transmission to the communication device that sent the ACK frame.

In an embodiment, clock calculation and compensation unit 304 does not compensate the timestamps before sending the timestamp information to network interface 306. A decision regarding whether to compensate the timestamps before sending them to the communication device may be determined based on several factors. In various embodiments, the decision whether to compensate may be made during an initial association period between the communication devices, at any time after the initial association period, as part of a communication protocol, and/or based on the type of communication device. For example, communication device 300 may be implemented as, or part of, a mobile device powered by a battery while the communication device sending the ACK frame is powered by alternating current (AC) AC power source. In such a case, the two communication devices may communicate in accordance with a communication protocol to determine that compensation will be performed at the communication device utilizing the AC power source. As a result, calculation and compensation unit 304 may receive instructions from network interface 306 not to compensate ToA and ToD timestamps to save processing power and improve battery life.

In various embodiments, clock calculation and compensation unit 304 and network interface 306 share the calculation of compensated timestamps. For example, network interface 306 optionally calculates the compensated timestamps or offloads these calculations to clock calculation and compensation unit 304. In accordance with an embodiment whereby clock calculation and compensation unit 304 performs the timestamp compensation, clock calculation and compensation unit 304 is configured to send one or more indications and/or notifications to network interface 306 indicating that the ToA and/or ToD timestamps have been compensated. In accordance with an embodiment whereby network interface 306 performs the timestamp compensation, these indications and/or notifications do not need to be sent by clock calculation and compensation unit 304.

If the timestamps have been compensated, network interface 306 sends an indication and/or notification to the other communication device indicating that compensation has taken place. In various embodiments, such indications and/or notifications of whether the timestamps have been compensated include communications via one or more communication protocols, a flag bit being set to a logical bit value based on whether timestamp compensation has taken place, a separate data packet including such an indication, whereby an absence of this data packet indicates that no compensation has been performed, etc.

To explain the process of timestamp compensation performed by clock calculation and compensation unit 304 and/or network interface 306, the following equations and discussion are provided in reference to FIG. 2, but are not limited to only those embodiments. As previously discussed, an estimated round trip time is calculated according to Equation 1, at least in some embodiments.

By assuming the communication device sending the fine timing measurement request frame is the first communication device and the communication device sending the ACK frame is the second communication device, Equation 1 is rewritten to denote the communication device time reference associated with each recorded timestamp as follows:

$$RTT_{EST} = (t_4^{(1)} - t_1^{(1)}) + (t_2^{(2)} - t_3^{(2)}).$$ Equ. 2

However, due to differences in clock frequencies between the two communication devices, a more accurate calculation of round trip time is obtained based on the timestamps converted to a single device time rail. Accordingly, the following equation represents a more accurate round trip time calculation having higher accuracy due to performing clock compensation such as described above:

$$RTT_{TRUE} = (t_4^{(2)} - t_1^{(2)}) + (t_2^{(2)} - t_3^{(2)}).$$ Equ. 3

The clock offset between the first and second communication devices may be expressed as a difference in parts-per-million ($ppm_{1-2}$). The difference between $RTT_{EST}$ and $RTT_{TRUE}$ is represented as an error term introduced by the clock offset. The error term varies based on the communications protocol and frame size implemented, at least in some embodiments and/or scenarios. In accordance with an embodiment in which an IEEE 802.11 Standard protocol is used for communications between the first and second communication devices, the term $(t_4^{(1)} - t_1^{(1)})$ is less than the term $(t_2^{(2)} - t_3^{(2)})$, since the propagation time (one half of the RTT) is generally a very small time period and the time period represented by $(t_2^{(2)} - t_3^{(2)})$ includes a SIFS time interval. In such an embodiment, the error term ERR is expressed by Equation 4 (below), which takes into account that the greatest ERR is controlled by the larger term $(t_2^{(2)} - t_3^{(2)})$. In some embodiments, the Equation 4 represents a maximum error term introduced by the clock offset:

$$ERR = ppm_{1-2}(t_2^{(2)} - t_3^{(2)}) = ppm_{1-2}[DUR(FTM_{Frame}) - SIFS]$$ Equ. 4

In Equation 4, $DUR(FTM_{Frame})$ represents a time period associated with the duration of the fine timing measurement request interval sent by a communications device, and SIFS represents the SIFS time period between receipt of the fine timing measurement request frame and the transmission of the ACK frame, which is generally about 16 microseconds. As a result of the error term provided by Equation 4, it is shown that a clock offset of 40 ppm together with a lowest 802.11 modulation and coding scheme results in errors between $RTT_{EST}$ and $RTT_{TRUE}$ greater than 3 ns, which in turn corresponds to a distance measurement error in excess of 1 meter. As a result, those skilled in the art will appreciate that without clock offset compensation, obtaining greater degrees of accuracy is problematic.

In accordance with an embodiment of the present disclosure, the timestamp compensation for timestamps t1 and t4 may be represented by the following equations:

$$\left[ t_1^{(2)} = \frac{(t_1^{(1)})}{(1 + ppm_{1-2})} \right]; \text{ and}$$ Equ. 5

$$\left[ t_4^{(2)} = \frac{(t_4^{(1)})}{(1 + ppm_{1-2})} \right].$$ Equ. 6

Therefore, in accordance with embodiments whereby clock calculation and compensation unit 304 and/or network interface 306 compensate timestamps t1 and t4 before sending them to the second communication device as feedback, the compensated timestamps $t_1^{(2)}$ and $t_4^{(2)}$ from Equations 5 and 6 above are sent to the second communication device.

Clock calculation and compensation unit 304 is coupled to memory 302 and is configured to communicate with memory 302 to store to and read data from memory 302. In accordance with various embodiments of the present disclosure, memory 302 includes a volatile (e.g., a random access memory (RAM), or a non-volatile memory (e.g., battery backed RAM, FLASH, etc.). In various embodiments of the present disclosure, memory 302 stores data related to timestamps determined by network interface 306, compensated timestamps calculated by network interface 306 and/or clock calculation and compensation unit 304, and/or feedback messages sent via network interface 306. Clock calculation and compensation unit 304 optionally reads data from memory 302 to correlate a particular set of communication devices with one more previously sent feedback messages and/or calculated timestamps. This process is useful in at least some embodiments in which communication device 300 is implemented as, or part of, a UE device with limited processing power and/or battery life, since it conserves processing time, processing power, and/or battery life. In some embodiments, memory 302 is included in network interface 306. In some embodiments, memory 302 is included in clock calculation and compensation unit 304.

Clock calculation and compensation unit 304 optionally accesses memory 302 to compare one or more previously received timestamps to determine if a communication device has moved and, if so, a rate of movement based on the previous timestamps. Clock calculation and compensation unit 304 and/or network interface 306 optionally uses this information to update the frequency at which fine timing measurement requests are sent. In such embodiments, clock calculation and compensation unit 304 and/or network interface 306 update distance calculations more frequently when a history of timestamps indicate that a communication device sending ACK frames is moving. By updating this information more frequently, communication device 300 can quickly adapt to the varying range, for example, by increasing transmit power, etc.

Figure 4:
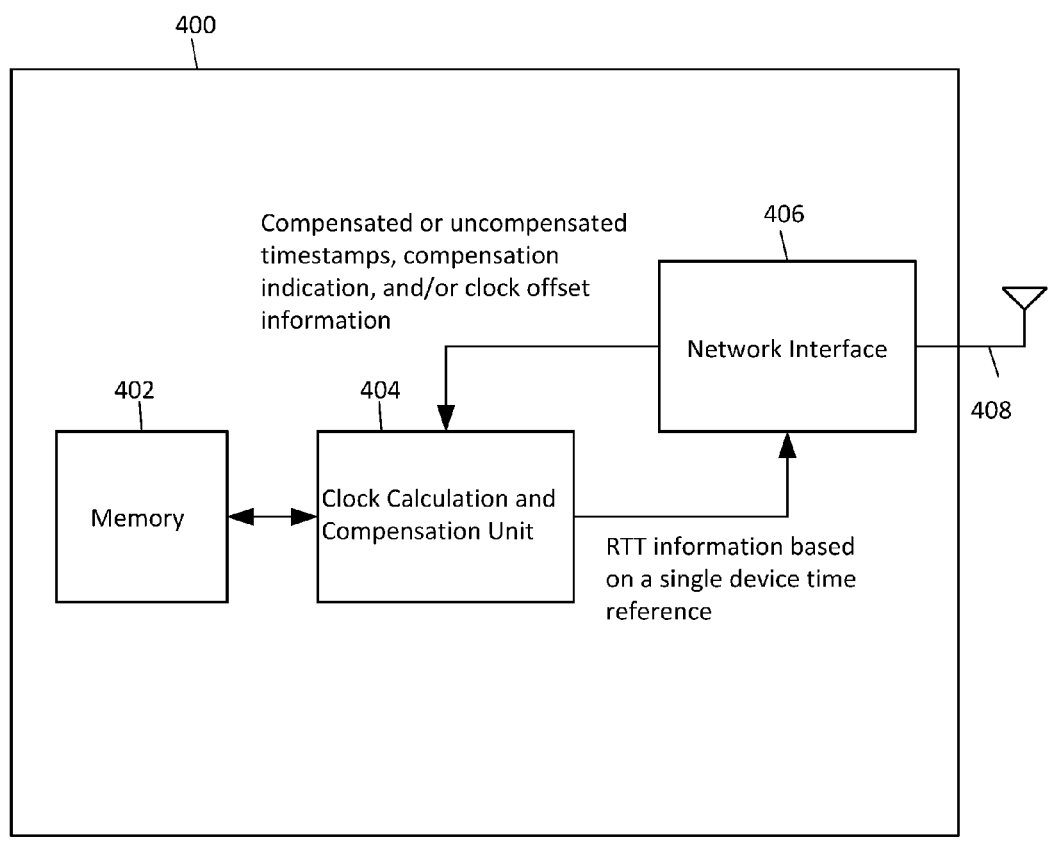
FIG. 4 is an example communication device in accordance with an embodiment of the present disclosure.

FIG. 4 is an example communication device 400 in accordance with an embodiment of the present disclosure. Communication device 400 includes memory 402, clock calculation and compensation unit 404, network interface 406, and antenna 408. In accordance with various embodiments of the present disclosure, communication device 400 is implemented as, or part of, a communication device that is a part of network 10, such as AP 14, and/or the second communication device discussed with regard to FIG. 2, for example. In accordance with further embodiments, timing compensation system 400 is implemented as part of any suitable communication device and is not limited to only those devices that are a part of network 10. In some embodiments, memory 402 is included in network interface 406. In some embodiments, memory 402 is included in clock calculation and compensation unit 404.

Memory 402, clock calculation and compensation unit 404, network interface 406, and antenna 408 have a similar structure and operate substantially the same as the memory 302, clock calculation and compensation unit 304, network interface 306, and antenna 308, respectively, as illustrated in FIG. 3. Therefore, only differences between these elements will be described for purposes of brevity. In an embodiment of the present disclosure, communication device 300 and communication device 400 are each implemented as, or as part of, respective communication devices that are in communication with one another. For example, in accordance with various embodiments of the disclosure, communication device 300 is implemented as, or part of, a communication device illustrated in FIG. 2 that sends fine timing measurement request frame 202, and communication device 400 is implemented as, or part of, a communication device illustrated in FIG. 2 that sends ACK frame 204.

Network interface 406 is configured to receive time stamp information and/or one or more fine timing measurement request frames from another communication device and to determine an appropriate time stamp associated with when the fine timing measurement request frame was received at antenna 408 (e.g., t2 ToA in FIG. 2). Network interface 406 is configured to send an ACK frame back to the communication device that sent the fine timing measurement request frame in response to receiving the fine timing measurement request frame and to determine an appropriate time stamp associated with when the ACK frame is sent from antenna 408 (e.g., t3 ToD in FIG. 2). Network interface 406 is configured to optionally send the ToA and/or ToD timestamps to another communication device.

Additionally or alternatively, network interface 406 is configured to determine a clock frequency used by the communication device sending the fine timing measurement request frame. As previously discussed with reference to timing compensation system 300 in FIG. 3, this information may be obtained from the communication device sending the fine timing measurement request frame. Network interface 406 is configured to determine a clock offset based on this clock frequency, the clock offset being a difference between a frequency of the local clock used by network interface 406 and the frequency of a clock used by the communication device sending the fine timing measurement request frame. Network interface 406 is configured to send the clock offset information and/or ToA/ToD timestamps to clock calculation and compensation unit 404.

Network interface 406 is configured to receive timestamp information from the communication device sending the fine timing measurement request frame (e.g., t1 and t4 in FIG. 2). This timestamp information may have been compensated to be in terms of the clock frequency used by network interface 406 for timestamping. If the timestamp information has been compensated, then network interface 406 receives an indication and/or notification from the communication device sending the fine timing measurement request frame that indicates that the timestamp information has been compensated. If an indication and/or notification flag is received, network interface 406 optionally instructs clock calculation and compensation unit 404 to not compensate the received timestamps. Thus, in some embodiments in which network interface 406 performs compensation, network interface 406 does not compensate the timestamps received if a compensation an indication and/or notification flag is present.

In various embodiments, network interface 406 and/or clock calculation and compensation unit 404 determines the round trip time $RTT_{TRUE}$ based on Eqn. 3, since the compensated timestamps (e.g., t1 and t4) are received in terms of the same time rail as the communication device 400, since the compensated timestamps (e.g., t2 and t3) are received in terms of the same time rail as the other communication device that transmitted the fine timing request.

However, if no indication and/or notification of compensation is received, network interface 406 and/or clock calculation and compensation unit 404 optionally (i) calculates compensated timestamps for the timestamps received (e.g., t1 and t4) in terms of the clock frequency used by network interface 406, or (ii) calculates compensated timestamps for the timestamps generated locally (e.g., t2 and t3) in terms of the clock frequency used by the communication device sending the fine timing measurement request frame. In accordance with an embodiment of the present disclosure in which compensated timestamps t1 and t4 are calculated, network interface 406 and/or clock calculation and compensation unit 404 use Equations 5 and 6 (above), respectively. In accordance with another embodiment in which compensated timestamps t2 and t3 are calculated, network interface 406 and/or clock calculation and compensation unit 404 use the Equations 7 and 8 (below), respectively.

$$\left[ t_2^{(1)} = \frac{(t_2^{(2)})}{(1 + ppm_{1-2})} \right]; \text{and} \qquad \text{Equ. 7}$$

$$\left[ t_3^{(1)} = \frac{(t_3^{(2)})}{(1 + ppm_{1-2})} \right]. \qquad \text{Equ. 8}$$

In accordance with an embodiment in which timestamps are compensated in terms of the communication device sending the fine timing measurement request frame, the following equation provides $RTT_{TRUE}$:

$$RTT_{TRUE} = (t_4^{(1)} - t_1^{(1)}) + (t_2^{(1)} - t_3^{(1)}). \qquad \text{Equ. 9}$$

Once network interface 406 and/or clock calculation and compensation unit 404 calculate $RTT_{TRUE}$ based on either Eqn. 6 or Eqn. 8, a distance between the two communication devices is then calculated by multiplying half of $RTT_{TRUE}$ by a propagation velocity constant. In various embodiments of the present disclosure, the propagation velocity constant is the speed of light in a vacuum or some fraction thereof to accommodate for a reduction of the speed of light via the propagation medium (i.e., the Earth's atmosphere).

Once a distance between communication devices is determined, network interface 406 is configured to share the distance information with other communication devices. In an embodiment in which communication device 400 is implemented as, or part of, a device within network 10, network interface 406 is configured to share the distance information with any number of other devices in network 10. In this way, any number of communication devices within a network is configured to obtain accurate information regarding a ranging distance separating one another. Accurate distance information may be useful, for example, to reduce transmit power when applicable to allow for better power savings.

Figure 5:
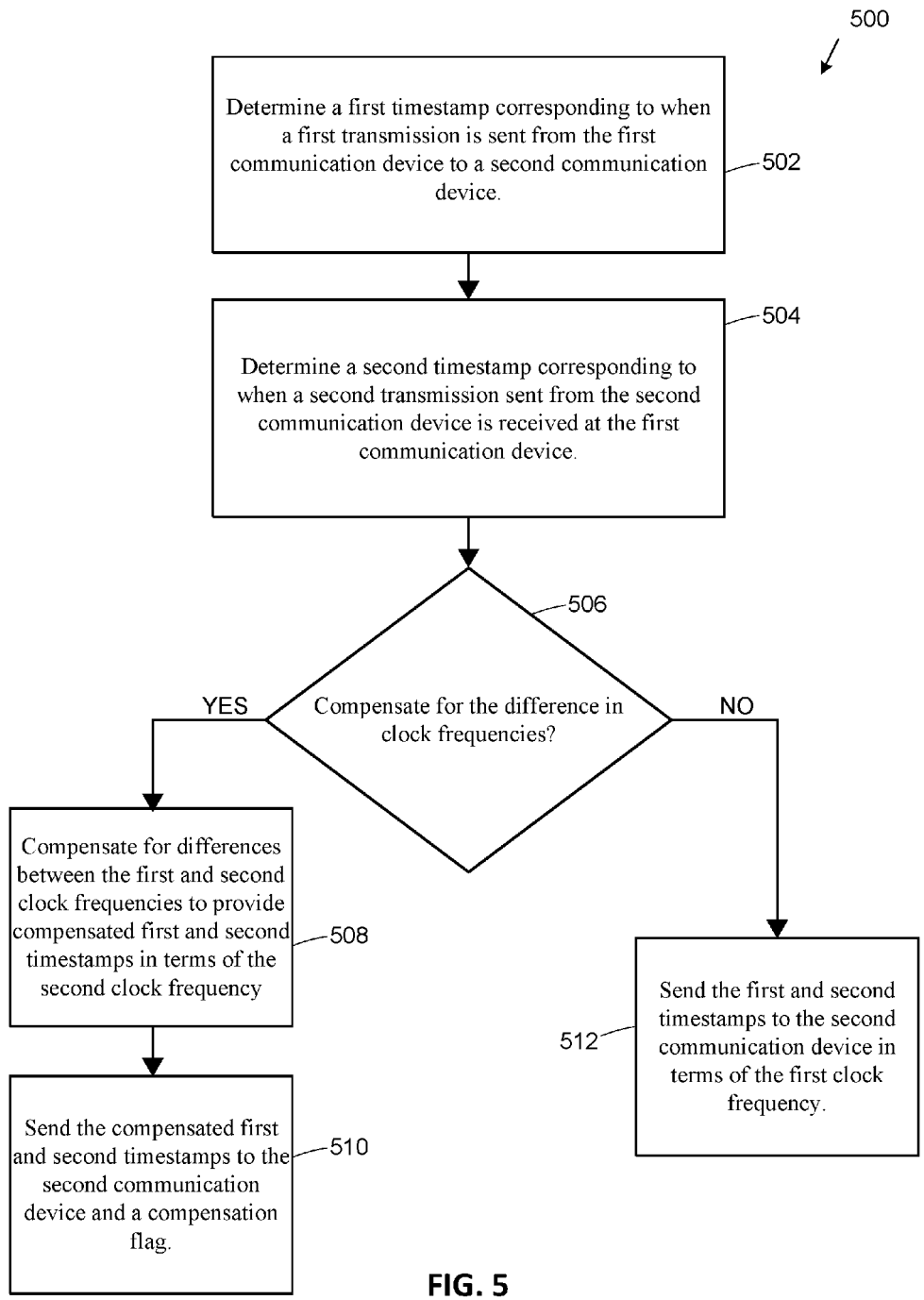
FIG. 5 is a flow diagram of an example method for measuring a propagation time in accordance with an embodiment of the present disclosure.

FIG. 5 is a flow diagram of an example timing compensation method 500 in accordance with an embodiment of the present disclosure. In an embodiment, timing compensation method 500 is implemented by the communication device 300, as shown in FIG. 3, e.g., by the network interface 306 and/or the clock calculation and compensation unit 304.

Method 500 begins at block 502, at which a first communication device determines a first timestamp corresponding to when a first transmission is sent from the first communication device to a second communication device. This transmission includes, for example, a fine timing measurement request frame, as shown in FIG. 2, and the associated timestamp t1. In other embodiments, the first timestamp is not included in the fine timing measurement request frame, but merely stored in a memory of the first communication device and associated with the fine timing measurement request frame.

At block 504, the first communication device determines a second timestamp corresponding to when a second transmission sent from the second communication device is received at the first communication device. This transmission could include, for example, an ACK frame, as shown in FIG. 2, and the associated timestamp t4.

At block 506, the first communication device determines whether to compensate for the difference in clock frequencies between the first and second communication devices. If it is determined that the first communication device is to compensate for the difference in clock frequencies, then method 500 proceeds to block 508. If it is determined that the first communication device is not to compensate for the difference in clock frequencies, method 500 proceeds to block 512. Block 506 includes exchanging information between the first communication device and the second communication device that indicates which of the first communication device and the second communication device is to perform time stamp compensation, in some embodiments. The determination at block 506 is based on information exchanged between the first communication device and the second communication device that indicates which of the first communication device and the second communication device is to perform time stamp compensation, in some embodiments.

In another embodiment, block 506 does not include exchanging information between the first communication device and the second communication device that indicates which of the first communication device and the second communication device is to perform time stamp compensation; and the determination at block 506 is not based on information exchanged between the first communication device and the second communication device that indicates which of the first communication device and the second communication device is to perform time stamp compensation. Rather, in an embodiment, a communication protocol defines which of the first communication device and the second communication device is to perform time stamp compensation. For example, in an embodiment, communication protocol specifies that a communication device (e.g., the first communication device or the second communication device) that requested a signal exchange (which includes the first transmission and the second transmission) is to perform time stamp compensation. Thus, in an embodiment, block 506 includes: determining, at the first communication device, whether the first communication device requested a signal exchange that includes the first transmission and the second transmission; and determining, at the first communication device, whether to compensate for the difference in clock frequencies between the first and second communication devices based on whether the first communication device requested the signal exchange.

In one embodiment, the communication protocol specifies that the communication device that requested the signal exchange (which includes the first transmission and the second transmission) is to perform time stamp compensation to compensate for the difference in clock frequencies between the first and second communication devices. In another embodiment, the communication protocol specifies that the other communication device that did not request the signal exchange (which includes the first transmission and the second transmission) is to perform time stamp compensation to compensate for the difference in clock frequencies between the first and second communication devices. In yet another embodiment, when one of the first communication device and the second communication device is an AP and the other of the first communication device and the second communication device is a client station, the communication protocol specifies that the AP is to perform time stamp compensation to compensate for the difference in clock frequencies between the first and second communication devices. In still another embodiment, when one of the first communication device and the second communication device is an AP and the other of the first communication device and the second communication device is a client station, the communication protocol specifies that the client station is to perform time stamp compensation to compensate for the difference in clock frequencies between the first and second communication devices.

At block 508, the first communication device compensates for differences between the first and second clock frequencies to provide compensated first and second timestamps in terms of the second clock frequency (i.e., the clock frequency used by the second communication device). In an embodiment, the timestamps that are compensated are timestamps t1 and t4, as shown in FIG. 2.

At block 510, the first communication device sends the compensated first and second timestamps to the second communication device. In an embodiment, the first communication device also sends a compensation indication indicating that the compensation has been performed.

On the other hand, at block 512 the first communication device sends the first and second timestamps to the second communication device in terms of the first clock frequency. In other words, the first communication device sends the first and second timestamp back to the second communication device uncompensated, i.e., in terms of the first communication device clock frequency. In various embodiments, the first communication device optionally sends an indication indicating that no compensation has been performed on these timestamps at the first communication device.

Figure 6:
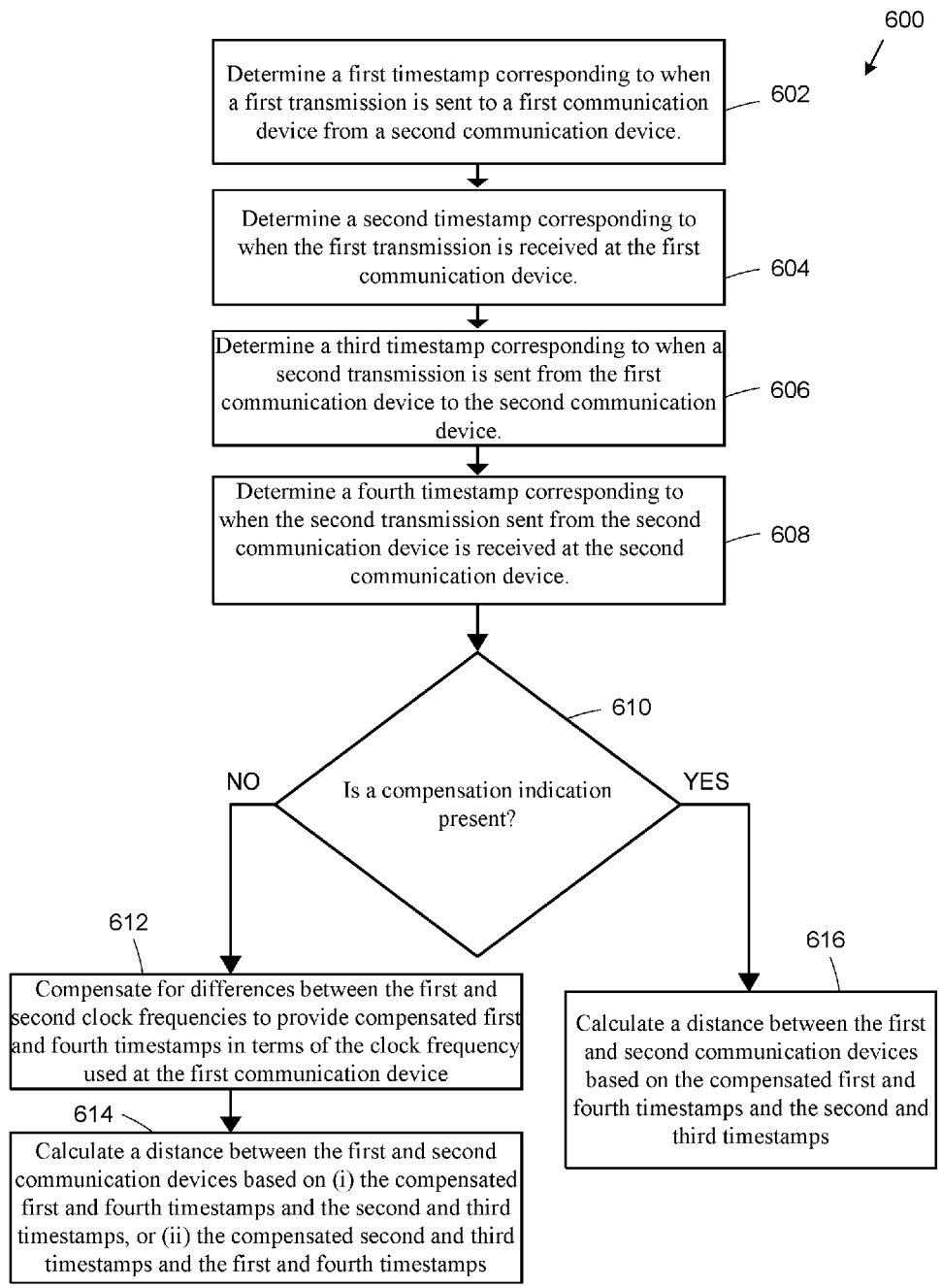
FIG. 6 a flow diagram or an example method for measuring propagation time in accordance with an embodiment of the present disclosure.

FIG. 6 is a flow diagram of an example timing compensation method 600 in accordance with an embodiment of the present disclosure. In an embodiment, timing compensation method 600 is by the communication device 400 illustrated in FIG. 4, e.g., by the network interface 406 and/or the clock calculation and compensation unit 404.

Method 600 begins at block 602, at which a first communication device determines a first timestamp corresponding to when a first transmission is transmitted by a second communication device. The first transmission is a fine timing measurement request frame, as shown in FIG. 2, and the first timestamp is the associated timestamp t1, in an embodiment. In an embodiment, the first timestamp t1 is received in a feedback transmission from the second communication device.

At block 604, the first communication device determines a second timestamp corresponding to when the first transmission is received at the first communication device. This second timestamp is, for example, timestamp t2 as shown in FIG. 2, in an embodiment.

At block 606, the first communication device determines a third timestamp corresponding to when a second transmission is transmitted by the first communication device. The second transmission is, for example, an ACK frame, as shown in FIG. 2, and the third timestamp is the associated timestamp t3, in an embodiment.

At block 608, the first communication device determines a fourth timestamp corresponding to when the second transmission is received at the second communication device. The fourth timestamp is, for example, timestamp t4 in FIG. 2. In an embodiment, the fourth timestamp t4 is received as a feedback transmission from the second communication device.

At block 610, the first communication device determines whether a compensation indication has been received from the second communication device. If the compensation indication has been received from the second communication device, then method 600 proceeds to block 616. If the compensation indication has not been received from the second communication device, method 600 proceeds to block 612.

In another embodiment, block 610 does not involve determining whether a compensation indication has been received from the second communication device. Rather, in an embodiment, a communication protocol defines which of the first communication device and the second communication device is to perform time stamp compensation. For example, in an embodiment, communication protocol specifies that a communication device (e.g., the first communication device or the second communication device) that requested a signal exchange (which includes the first transmission and the second transmission) is to perform time stamp compensation. Thus, in an embodiment, block 610 includes: determining, at the first communication device, whether the first communication device requested a signal exchange that includes the first transmission and the second transmission; and determining, at the first communication device, whether to compensate for the difference in clock frequencies between the first and second communication devices based on whether the first communication device requested the signal exchange.

At block 612, the first communication device compensates for differences between a first frequency of a first clock of the first communication device and a second frequency of a second clock of the second communication device to provide compensated first and fourth timestamps in terms of the clock frequency used at the first communication device, in an embodiment. For example, the first and fourth timestamps include the timestamps t1 and t4, as shown in FIG. 2, which were received as a feedback transmission from the second communication device, in an embodiment. Alternatively, at block 612, the first communication device compensates for differences the first frequency of the first clock and the second frequency of the second clock to provide compensated second and third timestamps in terms of the second clock frequency used at the second communication device. For example, the second and third timestamps are the timestamps t2 and t3, as shown in FIG. 2, in an embodiment.

At block 614, the first communication device calculates a distance between the first and second communication devices based on (i) the compensated first and fourth timestamps, and the second and third timestamps, or (ii) the compensated second and third timestamps, and the first and fourth timestamps.

At block 616, the first communication device calculates a distance between the first and second communication devices based on the compensated first and fourth timestamps, and the second and third timestamps.

Although the previous Figures and disclosure discuss the exchange of timestamps and compensation thereof in a particular direction, embodiments of the present disclosure include compensation of any appropriate timestamps corresponding to appropriate communications between two or more communication devices. For example, although timestamps t1 and t4 are illustrated as feedback, embodiments of the present disclosure include sending timestamps t2 and t3 as feedback to the communication device sending the fine timing measurement request. The embodiments described herein apply reciprocally and equally between two or more communication devices. For example, in an embodiment in which timestamps t2 and t3 are fed back to the communication device that sent the fine timing measurement request, these timestamps may be compensated or uncompensated, and a notification and/or indicator indicating any compensation (or lack thereof) is sent as well. Further in accordance with such embodiments, the communication device that sent the fine timing measurement request compensates t2 and t3 (or t1 and t4) based on this indication to calculate a true RTT (and distance calculation) in terms of its own time rail reference. The embodiments illustrated in FIGS. 3 and 4 and interchangeable, and their functionality associated with FIG. 2 has been provided only for purposes of clarity.

The Figures presented herein are for illustrative purposes. Communications and/or couplings between various elements illustrated throughout the Figures may be performed using any type of coupling or means of communications to accomplish the corresponding operations as described herein. For example, even though single lines are used to illustrate communications between some elements, this communication may be implemented with any number of wires and/or buses. Furthermore, such communications may be implemented with any appropriate communication protocol, such as serial or parallel communications, regardless of the illustrated couplings.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable storage medium such as on a magnetic disk, an optical disk, in a RAM or ROM or flash memory, tape drive, etc. Likewise, the software or firmware instructions may be delivered to a user or a system via any known or desired delivery method. The software or firmware instructions may include machine readable instructions that, when executed by the processor, cause the processor to perform various acts.

When implemented in hardware, the hardware may comprise one or more of discrete components, an integrated circuit, an ASIC, a programmable logic device (PLD), etc.

Further aspects of the present invention relate to one or more of the following clauses.

A first embodiment includes a method for clock compensation between i) a first communication device utilizing a first clock having a first clock frequency, and ii) a second communication device utilizing a second clock having a second clock frequency includes determining, at the first communication device, a first timestamp corresponding to when a first transmission is transmitted by the second communication device and determining, at the first communication device, a second timestamp corresponding to when a second transmission is received at the second communication device. The method further includes determining, at the first communication device, whether a compensation indicator has been received from the second communication device, and compensating, at the first communication device, for a difference between the first clock frequency and the second clock frequency to provide a compensated first timestamp and a compensated second timestamp when it is determined that the compensation indicator has not been received from the second communication device. Further in accordance with such an embodiment, the presence of the compensation indicator indicates that the first timestamp and second timestamps are received in terms of the first clock frequency and do not need to be compensated.

The first embodiment further includes variations such as determining, at the first communication device, a third timestamp corresponding to when the first transmission is received at the first communication device based on the first clock frequency, and determining, at the first communication device, a fourth timestamp corresponding to when the second transmission is transmitted by the first communication device based on the first clock frequency.

Furthermore, the first embodiment includes variations such as calculating, at the first communication device, a distance between the first communication device and the second communication device based on the compensated first timestamp, the compensated second timestamp, the third timestamp, and the fourth timestamp, when it is determined that the compensation indicator has not been received, and calculating, at the first communication device, the distance between the first communication device and the second communication device based on the first timestamp, the second timestamp, the third timestamp, and the fourth timestamp, when it is determined that the compensation indicator has been received.

In addition, the first embodiment further includes performing the act of compensating by evaluating:
(i) a first equation:

$$\left[t_1^{(2)} = \frac{(t_1^{(1)})}{(1+ppm_{1-2})}\right] \text{ for } t_1^{(2)},$$

and
(ii) a second equation:

$$\left[t_2^{(2)} = \frac{(t_2^{(1)})}{(1+ppm_{1-2})}\right] \text{ for } t_2^{(2)},$$

in which case $t_1^{(1)}$ and $t_2^{(1)}$ represent the first timestamp and the second timestamp, respectively, $ppm_{1-2}$ represents a difference between the first clock frequency and the second clock frequency in parts-per-million, and $t_1^{(2)}$ and $t_2^{(2)}$ represent the compensated first timestamp and the compensated second timestamp, respectively.

Still further, the first embodiment also includes variations in which the first transmission includes a fine timing measurement request and in which the second transmission includes an acknowledgement of the fine timing measurement request.

Finally, the first embodiment includes variations in which each of the first transmission and the second transmission conforms to a wireless networking communication protocol.

A second embodiment includes a method for clock compensation between i) a first communication device utilizing a first clock having a first clock frequency, and ii) a second communication device utilizing a second clock having a second clock frequency includes determining, at the first communication device, a first timestamp corresponding to when a first transmission is transmitted by the first communication device and determining, at the first communication device, a second timestamp corresponding to when a second transmission is received at the first communication device. The method further includes compensating, at the first communication device, for a difference between the first clock frequency and the second clock frequency to provide a compensated first timestamp and a compensated second timestamp, sending, from the first communication device, the compensated first timestamp and the compensated second timestamp to the second communication device, and sending, from the first communication device, a compensation indicator to the second communication device. Further in accordance with such an embodiment, the compensation indicator indicates that the second communication device does not need to compensate for the difference between the first clock frequency and the second clock frequency with respect to the compensated first timestamp and the compensated second timestamp.

The second embodiment further includes variations such as determining, at the second communication device, a third timestamp corresponding to when the first transmission is received at the second communication device based on the second clock frequency, and determining, at the second communication device, a fourth timestamp corresponding to when the second transmission is transmitted by the second communication device based on the second clock frequency.

Furthermore, the second embodiment includes variations such as calculating, at the second communication device, a distance between the first communication device and the second communication device based on the compensated first timestamp, the compensated second timestamp, the third timestamp, and the fourth timestamp.

In addition, the second embodiment further includes performing the act of compensating by evaluating:

(i) a first equation:

$$\left[t_1^{(2)} = \frac{(t_1^{(1)})}{(1+ppm_{1-2})}\right] \text{ for } t_1^{(2)};$$

and (ii) a second equation:

$$\left[t_2^{(2)} = \frac{(t_2^{(1)})}{(1+ppm_{1-2})}\right] \text{ for } t_2^{(2)},$$

in which case $t_1^{(1)}$ and $t_2^{(1)}$ represent the first timestamp and the second timestamp, respectively, $ppm_{1-2}$ represents a difference between the first clock frequency and the second clock frequency in parts-per-million, and $t_1^{(2)}$ and $t_2^{(2)}$ represent the compensated first timestamp and the compensated second timestamp, respectively.

Still further, the second embodiment also includes variations in which the first transmission includes a fine timing measurement request and the second transmission includes an acknowledgement of the fine timing measurement request.

Finally, the second embodiment includes variations in which each of the first transmission and the second transmission conforms to a wireless networking communication protocol.

In a third embodiment, a first communication device is configured to utilize a first clock having a first clock frequency and includes a network interface configured to determine a first timestamp corresponding to when a first transmission is transmitted by a second communication device that utilizes a second clock having a second clock frequency, and to determine a second timestamp corresponding to when a second transmission is received at the second communication device. The first communication device further includes a clock calculation and compensation unit configured to determine whether a compensation indicator was received from the second communication device, and to compensate for differences between the first clock frequency and the second clock frequency to provide a compensated first timestamp and a compensated second timestamp when the compensation indicator is not received from the second communication device. Further in accordance with such an embodiment, the presence of the compensation indicator indicates that the first timestamp and the second timestamp are received in terms of the first clock frequency and do not need to be compensated.

The third embodiment further includes variations such as the clock calculation and compensation unit being configured to not compensate for differences between the first clock frequency and the second clock frequency to provide the compensated first timestamp and the compensated second timestamp when the compensation indicator is received.

Furthermore, the third embodiment includes variations such as the clock calculation and compensation unit being configured to determine a third timestamp corresponding to when the first transmission is received at the first communication device based on the first clock frequency, and to determine a fourth timestamp corresponding to when the second transmission is sent to the second communication device based on the first clock frequency.

In addition, the third embodiment further includes variations such as the clock calculation and compensation unit being configured to calculate a distance between the first communication device and the second communication device based on the compensated first timestamp, the compensated second timestamp, the third timestamp, and the fourth timestamp, when the compensation indicator is not received, and to calculate a distance between the first communication device and the second communication device based on the first timestamp, the second timestamp, the third timestamp, and the fourth timestamp, when the compensation indicator is received.

Still further, the third embodiment also includes variations in which the clock calculation and compensation unit is configured to compensate for differences between the first clock frequency and the second clock frequency by evaluating:

(i) a first equation:

$$\left[t_1^{(2)} = \frac{(t_1^{(1)})}{(1+ppm_{1-2})}\right] \text{ for } t_1^{(2)},$$

and (ii) a second equation:

$$\left[t_2^{(2)} = \frac{(t_2^{(1)})}{(1+ppm_{1-2})}\right] \text{ for } t_2^{(2)},$$

in which case $t_1^{(1)}$ and $t_2^{(1)}$ represent the first timestamp and the second timestamp, respectively, $ppm_{1-2}$ represents a difference between the first clock frequency and the second clock frequency in parts-per-million, and $t_1^{(2)}$ and $t_2^{(2)}$ represent the compensated first timestamp and the compensated second timestamp, respectively.

Additionally, the third embodiment includes variations in which the network interface is configured to send the first transmission including a fine timing measurement request, and to receive the second transmission including an acknowledgement of the fine timing measurement request sent from the second communication device.

Finally, the third embodiment includes variations in which each of the first transmission and the second transmission conforms to a wireless networking protocol.

In a fourth embodiment, a first communication device is configured to utilize a first clock having a first clock frequency, and includes a network interface configured to determine a first timestamp corresponding to when a first transmission is transmitted by the first communication device, and to determine a second timestamp corresponding to when a second transmission is received at the first communication device. Furthermore, the second transmission is transmitted by a second communication device that is configured to utilize a second clock having a second clock frequency. The first communication device further includes a clock calculation and compensation unit configured to compensate for differences between the first clock frequency and the second clock frequency to provide a compensated first timestamp and a compensated second timestamp. Further in accordance with such an embodiment, the network interface is also configured to cause the first communication device to send the compensated first timestamp and the compensated second timestamp and a compensation indicator to the second communication device, the compensation indicator indicates that the compensated first timestamp and the compensated second timestamp do not need to be compensated by the second communication device.

The fourth embodiment further includes variations such as the network interface being configured to determine a third timestamp corresponding to when the first transmission is received at the second communication device, and to determine a fourth timestamp corresponding to when the second transmission is transmitted by the second communication device.

Furthermore, the fourth embodiment includes variations such as the clock calculation and compensation unit being configured to calculate a distance between the first communication device and the second communication device based on the compensated first timestamp, the compensated second timestamp, the third timestamp, and the fourth timestamp.

Still further, the fourth embodiment also includes variations in which the clock calculation and compensation unit is configured to compensate the first timestamp and the second timestamp by evaluating:

(i) a first equation:

$$\left[ t_1^{(2)} = \frac{(t_1^{(1)})}{(1 + ppm_{1\text{-}2})} \right] \text{ for } t_1^{(2)},$$

and (ii) a second equation:

$$\left[ t_2^{(2)} = \frac{(t_2^{(1)})}{(1 + ppm_{1\text{-}2})} \right] \text{ for } t_2^{(2)},$$

in which case $t_1^{(1)}$ and $t_2^{(1)}$ represent the first timestamp and the second timestamp, respectively, $ppm_{1\text{-}2}$ represents a difference between the first clock frequency and the second clock frequency in parts-per-million, and $t_1^{(2)}$ and $t_2^{(2)}$ represent the compensated first timestamp and the compensated second timestamp, respectively.

Additionally, the fourth embodiment includes variations in which the network interface is configured to send the first transmission including a fine timing measurement request, and to receive the second transmission including an acknowledgement of the fine timing measurement request sent from the second communication device.

Finally, the fourth embodiment includes variations in which each of the first transmission and the second transmission conforms to a wireless networking protocol.

While various aspects of the present invention have been described with reference to specific examples, which are intended to be illustrative only and not to be limiting of the invention, changes, additions and/or deletions may be made to the disclosed embodiments without departing from the scope of the invention.

What is claimed:

1. A method, comprising:
   determining, at a first communication device that utilizes a first clock having a first clock frequency, a first timestamp corresponding to when a first transmission is transmitted by a second communication device that utilizes a second clock having a second clock frequency;
   determining, at the first communication device, a second timestamp corresponding to when a second transmission is received at the second communication device; and
   determining, at the first communication device, whether the first communication device requested a signal exchange that includes the first transmission and the second transmission;
   determining, at the first communication device, whether the first communication device is to generate a compensated first timestamp and a compensated second timestamp to compensate for a difference between the first clock frequency and the second clock frequency, wherein the determining is based on whether the first communication device requested the signal exchange; and
   generating, at the first communication device, the compensated first timestamp and the compensated second timestamp in response to determining that the first communication device is to generate the compensated first timestamp and the compensated second timestamp to compensate for the difference between the first clock frequency and the second clock frequency;
   wherein a wireless communication protocol determines whether the first communication device or the second communication device is to generate the compensated first timestamp and the compensated second timestamp to compensate for the difference between the first clock frequency and the second clock frequency based on which of the first communication device or the second communication device requested the signal exchange that includes the first transmission and the second transmission.

2. The method of claim 1, further comprising:
   determining, at the first communication device, a third timestamp corresponding to when the first transmission is received at the first communication device based on the first clock frequency; and
   determining, at the first communication device, a fourth timestamp corresponding to when the second transmission is transmitted by the first communication device based on the first clock frequency.

3. The method of claim 2, further comprising:
   when the first communication device determines that the first communication device is to generate the compensated first timestamp and the compensated second timestamp to compensate for the difference between the first clock frequency and the second clock frequency, calculating, at the first communication device, a round trip time using the compensated first timestamp, the compensated second timestamp, the third timestamp, and the fourth timestamp; and
   when the first communication device determines that the first communication device is not to generate the compensated first timestamp and the compensated second timestamp to compensate for the difference between the first clock frequency and the second clock frequency:
     generating, at the first communication device, a compensated third timestamp and a compensated fourth timestamp to compensate for the difference between the first clock frequency and the second clock frequency, and
     calculating, at the first communication device, the round trip time using the first timestamp, the second timestamp, the compensated third timestamp, and the compensated fourth timestamp.

4. The method of claim 1, wherein the act of generating comprises:
evaluating a first equation:

$$\left[t_1^{(2)} = \frac{(t_1^{(2)})}{(1+ppm_{1-2})}\right] \text{for } t_1^{(2)};$$

and
evaluating a second equation:

$$\left[t_2^{(2)} = \frac{(t_2^{(2)})}{(1+ppm_{2-2})}\right] \text{for } t_2^{(2)},$$

wherein:
$t_1^{(1)}$ and $t_2^{(1)}$ represent the first timestamp and the second timestamp, respectively;
$ppm_{1-2}$ represents a difference between the first clock frequency and the second clock frequency in parts-per-million; and
$t_1^{(2)}$ and $t_2^{(2)}$ represent the compensated first timestamp and the compensated second timestamp, respectively.

5. The method of claim 1, wherein the first transmission includes a fine timing measurement packet, and
wherein the second transmission includes an acknowledgement of the fine timing measurement packet.

6. The method of claim 1, wherein the wireless communication protocol specifies that the communication device that requested the signal exchange is to generate the compensated first timestamp and the compensated second timestamp to compensate for the difference between the first clock frequency and the second clock frequency.

7. An apparatus, comprising:
a network interface associated with a first communication device, the network interface device implemented on one or more integrated circuit devices, the network interface including a first clock configured to operate at a first clock frequency;
a clock calculation and compensation unit implemented on one or more integrated circuit devices, the clock calculation and compensation unit configured to:
determine a first timestamp corresponding to when a first transmission is transmitted by a second communication device that utilizes a second clock having a second clock frequency,
determine a second timestamp corresponding to when a second transmission is received at the second communication device,
determine whether the first communication device requested a signal exchange that includes the first transmission and the second transmission,
determine whether the first communication device is to generate a compensated first timestamp and a compensated second timestamp to compensate for a difference between the first clock frequency and the second clock frequency, wherein the determining is based on whether the first communication device requested the signal exchange, and
generate the compensated first timestamp and the compensated second timestamp in response to determining first communication device is to generate the compensated first timestamp and the compensated second timestamp to compensate for the difference between the first clock frequency and the second clock frequency;
wherein a wireless communication protocol determines whether the first communication device or the second communication device is to generate the compensated first timestamp and the compensated second timestamp to compensate for the difference between the first clock frequency and the second clock frequency based on which of the first communication device or the second communication device requested the signal exchange that includes the first transmission and the second transmission.

8. The apparatus of claim 7, wherein the network interface is further configured to:
determine a third timestamp corresponding to when the first transmission is received at the first communication device based on the first clock frequency; and
determine a fourth timestamp corresponding to when the second transmission is transmitted by the first communication device to the second communication device based on the first clock frequency.

9. The apparatus of claim 8, wherein the clock calculation and compensation unit is further configured to:
when the clock calculation and compensation unit determines that the first communication device is to generate the compensated first timestamp and the compensated second timestamp to compensate for the difference between the first clock frequency and the second clock frequency, calculate a round trip time using the compensated first timestamp, the compensated second timestamp, the third timestamp, and the fourth timestamp; and
when the clock calculation and compensation unit determines that the first communication device is not to generate the compensated first timestamp and the compensated second timestamp to compensate for the difference between the first clock frequency and the second clock frequency:
generate a compensated third timestamp and a compensated fourth timestamp to compensate for the difference between the first clock frequency and the second clock frequency, and
generate the round trip time using the first timestamp, the second timestamp, the compensated third timestamp, and the compensated fourth timestamp.

10. The apparatus of claim 7, wherein the clock calculation and compensation unit is configured to:
evaluate a first equation:

$$\left[t_1^{(2)} = \frac{(t_1^{(2)})}{(1+ppm_{1-2})}\right] \text{for } t_1^{(2)};$$

and
evaluate a second equation:

$$\left[t_2^{(2)} = \frac{(t_2^{(2)})}{(1+ppm_{2-2})}\right] \text{for } t_2^{(2)},$$

wherein:
$t_1^{(1)}$ and $t_2^{(1)}$ represent the first timestamp and the second timestamp, respectively, ppm$_{1-2}$ represents a difference between the first clock frequency and the second clock frequency in parts-per-million, and t$_1^{(2)}$ and t$_2^{(2)}$ represent the compensated first timestamp and the compensated second timestamp, respectively.

11. The apparatus of claim 7, wherein the first transmission includes a fine timing measurement packet, and wherein the second transmission includes an acknowledgement of the fine timing measurement packet.

12. The apparatus of claim 7, wherein the wireless communication protocol specifies that the communication device that requested the signal exchange is to generate the compensated first timestamp and the compensated second timestamp to compensate for the difference between the first clock frequency and the second clock frequency.

13. A method, comprising:

determining, at a first communication device that utilizes a first clock having a first clock frequency, a first timestamp corresponding to when a first transmission is transmitted by the first communication device;

determining, at the first communication device, a second timestamp corresponding to when a second transmission is received at the first communication device from a second communication device that utilizes a second clock having a second clock frequency;

determining, at the first communication device, whether the first communication device requested a signal exchange that includes the first transmission and the second transmission;

determining, at the first communication device, whether the first communication device is to generate a compensated first timestamp and a compensated second timestamp to compensate for a difference between the first clock frequency and the second clock frequency, wherein the determining is based on whether the first communication device requested the signal exchange;

generating, at the first communication device, a compensated first timestamp and a compensated second timestamp in response to determining that the first communication device is to generate the compensated first timestamp and the compensated second timestamp to compensate for the difference between the first clock frequency and the second clock frequency;

sending, from the first communication device, the compensated first timestamp and the compensated second timestamp to the second communication device when the first communication device determines that the first communication device is to generate the compensated first timestamp and the compensated second timestamp to compensate for the difference between the first clock frequency and the second clock frequency; and sending, from the first communication device, the first timestamp and the second timestamp to the second communication device when the first communication device determines that the first communication device is not to generate the compensated first timestamp and the compensated second timestamp to compensate for the difference between the first clock frequency and the second clock frequency;

wherein a wireless communication protocol determines whether the first communication device or the second communication device is to generate the compensated first timestamp and the compensated second timestamp to compensate for the difference between the first clock frequency and the second clock frequency based on which of the first communication device or the second communication device requested the signal exchange that includes the first transmission and the second transmission.

14. The method of claim 13, further comprising:

determining, at the second communication device, a third timestamp corresponding to when the first transmission is received at the second communication device based on the second clock frequency; and determining, at the second communication device, a fourth timestamp corresponding to when the second transmission is transmitted by the second communication device based on the second clock frequency.

15. The method of claim 14, further comprising:

when the first communication device determines that the first communication device is to generate the compensated first timestamp and the compensated second timestamp to compensate for the difference between the first clock frequency and the second clock frequency, calculating, at the first communication device, a round trip time between the first communication device and the second communication device based on the compensated first timestamp, the compensated second timestamp, the third timestamp, and the fourth timestamp; and when the first communication device determines that the first communication device is not to generate the compensated first timestamp and the compensated second timestamp to compensate for the difference between the first clock frequency and the second clock frequency:

generating, at the first communication device, a compensated third timestamp and a compensated fourth timestamp to compensate for the difference between the first clock frequency and the second clock frequency, and calculating, at the first communication device, the round trip time using the first timestamp, the second timestamp, the compensated third timestamp, and the compensated fourth timestamp.

16. The method of claim 13, wherein the act of generating comprises:

evaluating a first equation:

$$\left[ t_1^{(2)} = \frac{(t_1^{(2)})}{(1 + ppm_{1-2})} \right] \text{for } t_1^{(2)};$$

and evaluating a second equation:

$$\left[ t_2^{(2)} = \frac{(t_2^{(2)})}{(1 + ppm_{2-2})} \right] \text{for } t_2^{(2)},$$

wherein:

t$_1^{(1)}$ and t$_2^{(1)}$ represent the first timestamp and the second timestamp, respectively;

ppm$_{1-2}$ represents a difference between the first clock frequency and the second clock frequency in parts-per-million; and t$_1^{(2)}$ and t$_2^{(2)}$ represent the compensated first timestamp and the compensated second timestamp, respectively.

17. The method of claim 13, wherein the first transmission includes a fine timing measurement packet, and wherein the second transmission includes an acknowledgement of the fine timing measurement packet.

18. The method of claim 13, wherein the wireless communication protocol specifies that the communication device that requested the signal exchange is to generate the compensated first timestamp and the compensated second timestamp to compensate for the difference between the first clock frequency and the second clock frequency.

19. An apparatus, comprising:
a network interface associated with a first communication device, the network interface device implemented on one or more integrated circuit devices, the network interface including a first clock configured to operate at a first clock frequency, the network interface configured to;
  determine a first timestamp corresponding to when a first transmission is transmitted by the first communication device, and
  determine a second timestamp corresponding to when a second transmission is received at the first communication device, the second transmission having been transmitted by a second communication device configured to utilize a second clock having a second clock frequency; and
a clock calculation and compensation unit implemented on one or more integrated circuit devices, the clock calculation and compensation unit configured to:
  determine whether the first communication device requested a signal exchange that includes the first transmission and the second transmission,
  determine whether the first communication device is to generate a compensated first timestamp and a compensated second timestamp to compensate for a difference between the first clock frequency and the second clock frequency, wherein the determining is based on whether the first communication device requested the signal exchange, and
  generate a compensated first timestamp and a compensated second timestamp in response to determining that the first communication device is to generate the compensated first timestamp and the compensated second timestamp to compensate for the difference between the first clock frequency and the second clock frequency;
wherein the network interface is further configured to:
  send the compensated first timestamp and the compensated second timestamp to the second communication device when the clock calculation and compensation unit determines that the first communication device is to generate the compensated first timestamp and the compensated second timestamp to compensate for the difference between the first clock frequency and the second clock frequency, and
  send the first timestamp and the second timestamp to the second communication device when the clock calculation and compensation unit determines that the first communication device is not to generate the compensated first timestamp and the compensated second timestamp to compensate for the difference between the first clock frequency and the second clock frequency;
wherein a wireless communication protocol determines whether the first communication device or the second communication device is to generate the compensated first timestamp and the compensated second timestamp to compensate for the difference between the first clock frequency and the second clock frequency based on which of the first communication device or the second communication device requested the signal exchange that includes the first transmission and the second transmission.

20. The apparatus of claim 19, wherein the clock calculation and compensation unit is configured to:
  determine a third timestamp corresponding to when the first transmission is received at the second communication device; and
  determine a fourth timestamp corresponding to when the second transmission is transmitted by the second communication device.

21. The apparatus of claim 20, wherein the clock calculation and compensation unit is further configured to:
  when the clock calculation and compensation unit determines that the first communication device is to generate the compensated first timestamp and the compensated second timestamp to compensate for the difference between the first clock frequency and the second clock frequency, calculate a round trip time between the first communication device and the second communication device based on the compensated first timestamp, the compensated second timestamp, the third timestamp, and the fourth timestamp; and
  when the clock calculation and compensation unit determines that the first communication device is not to generate the compensated first timestamp and the compensated second timestamp to compensate for the difference between the first clock frequency and the second clock frequency:
    generate a compensated third timestamp and a compensated fourth timestamp to compensate for the difference between the first clock frequency and the second clock frequency, and
    calculate the round trip time using the first timestamp, the second timestamp, the compensated third timestamp, and the compensated fourth timestamp.

22. The apparatus of claim 19, wherein the clock calculation and compensation unit is further configured to compensate the first timestamp and the second timestamp by:
  evaluating a first equation:

$$\left[t_1^{(2)} = \frac{(t_1^{(2)})}{(1 + ppm_{1-2})}\right] \text{ for } t_1^{(2)};$$

and
  evaluating a second equation:

$$\left[t_2^{(2)} = \frac{(t_2^{(2)})}{(1 + ppm_{2-2})}\right] \text{ for } t_2^{(2)},$$

wherein:
    $t_1^{(1)}$ and $t_2^{(1)}$ represent the first timestamp and the second timestamp, respectively;
    $ppm_{1-2}$ represents a difference between the first clock frequency and the second clock frequency in parts-per-million; and
    $t_1^{(2)}$ and $t_2^{(2)}$ represent the compensated first timestamp and the compensated second timestamp, respectively.

23. The apparatus of claim 19, wherein the first transmission includes a fine timing measurement packet, and the second transmission includes an acknowledgement of the fine timing measurement packet sent.

24. The apparatus of 19, wherein the wireless communication protocol specifies that the communication device that requested the signal exchange is to generate the compensated first timestamp and the compensated second timestamp to compensate for the difference between the first clock frequency and the second clock frequency.

* * * * *